(12) United States Patent
Venturelli

(10) Patent No.: US 11,644,851 B2
(45) Date of Patent: *May 9, 2023

(54) SYSTEM FOR AUTONOMOUS OPERATION OF MULTIPLE HYBRID UNMANNED AERIAL VEHICLES SUPPORTED BY RECHARGING STATION TO PERFORM SERVICES

(71) Applicants: HYUNDAI MOTOR COMPANY, Seoul (KR); KIA CORPORATION, Seoul (KR)

(72) Inventor: Davide Venturelli, Miami, FL (US)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/227,663

(22) Filed: Apr. 12, 2021

(65) Prior Publication Data

US 2022/0066476 A1 Mar. 3, 2022

Related U.S. Application Data

(63) Continuation of application No. 16/532,910, filed on Aug. 6, 2019, now Pat. No. 10,976,752, which is a (Continued)

(51) Int. Cl.
*G05D 1/10* (2006.01)
*G06Q 10/08* (2023.01)
(Continued)

(52) U.S. Cl.
CPC ............. *G05D 1/104* (2013.01); *B64C 25/34* (2013.01); *B64C 39/024* (2013.01); *G06Q 10/06311* (2013.01); *G06Q 10/08* (2013.01);
*G08G 5/0004* (2013.01); *G08G 5/0013* (2013.01); *G08G 5/0026* (2013.01); *G08G 5/0034* (2013.01); *G08G 5/0039* (2013.01);
(Continued)

(58) Field of Classification Search
CPC ...... G05D 1/104; B64C 25/34; B64C 39/024; B64C 2201/042; B64C 2201/141; G06Q 10/08; G08G 5/0013; G08G 5/0004; G08G 5/0026; G08G 5/0034; G08G 5/0039; G08G 5/0069; G08G 5/0082; G08G 5/0091
See application file for complete search history.

(56) References Cited

U.S. PATENT DOCUMENTS 9,102,406 B2 * 8/2015 Stark ................... G08G 5/0021
2016/0216711 A1 * 7/2016 Srivastava ........... G08G 5/0013

* cited by examiner

*Primary Examiner* — Gertrude Arthur Jeanglaude
(74) *Attorney, Agent, or Firm* — Morgan, Lewis & Bockius LLP

(57) ABSTRACT

An automated system and method for controlling a plurality of unmanned aerial vehicles (UAVs) is described. The system can include a receiver, a transmitter, and at least one processor in communication with a memory. The receiver receives first telemetric data from the plurality of UAVs. The transmitter is configured to transmit control data to the plurality of UAVs. The memory stores processor-issuable instructions to: substantially simultaneously determine a plurality of plans for each of the plurality of UAVs and for a predetermined time period based at least on the first telemetric data; and iteratively revise the plurality of plans.

18 Claims, 7 Drawing Sheets

Related U.S. Application Data continuation of application No. 15/738,236, filed as application No. PCT/US2016/039055 on Jun. 23, 2016, now Pat. No. 10,372,142.

(60) Provisional application No. 62/183,597, filed on Jun. 23, 2015.

(51) Int. Cl.
| | |
|---|---|
| *G08G 5/00* | (2006.01) |
| *B64C 25/34* | (2006.01) |
| *B64C 39/02* | (2023.01) |
| *G06Q 10/0631* | (2023.01) |
| *B64U 50/19* | (2023.01) |

(52) U.S. Cl.
CPC ......... *G08G 5/0069* (2013.01); *G08G 5/0082* (2013.01); *G08G 5/0091* (2013.01); *B64U 50/19* (2023.01); *B64U 2201/10* (2023.01)

SYSTEM FOR AUTONOMOUS OPERATION OF MULTIPLE HYBRID UNMANNED AERIAL VEHICLES SUPPORTED BY RECHARGING STATION TO PERFORM SERVICES

CROSS-REFERENCE TO RELATED APPLICATIONS

This application claims benefit of the earlier filing date of U.S. Provisional Patent Application No. 62/183,597, titled "System for Autonomous Operation of Multiple Unmanned Aerial Vehicles Supported by Recharging Stations to Perform Services," filed on Jun. 23, 2015, and International Patent Application No.: PCT/US16/26152, titled "Ground Movement System Plugin for Vertical Take Off and Landing Unmanned Aerial Vehicles," filed on Apr. 6, 2016, the entire contents of which are hereby incorporated by reference in their entirety.

All patents, patent applications and publications cited herein are hereby incorporated by reference in their entirety in order to more fully describe the state of the art as known to those skilled therein as of the date of the invention described herein.

FIELD OF THE INVENTION

One or more embodiments of the present disclosure generally relate to Unmanned Aerial Vehicles (UAVs), or "drones", and specifically to the autonomous control of UAVs.

BACKGROUND

UAVs are unmanned aircraft that can carry sensors, video cameras, communications equipment, or other payloads, and are typically remotely piloted individually by an operator or controlled by an automated system.

SUMMARY OF THE INVENTION

Embodiments described herein include an automated system for controlling a plurality of unmanned aerial vehicles (UAVs). The automated system can include a navigational system and/or a scheduling system. A navigational system and a scheduling system can collectively be referred to as a planning system. In some such embodiments, the system includes a receiver, a transmitter, and a processor in communication with a memory. The receiver receives a first telemetric data from the plurality of UAVs, and the transmitter is configured to transmit control data to the plurality of UAVs. The processor-issuable instructions can include instructions to: substantially simultaneously determine a plurality of plans (e.g., navigational, scheduling and/or other plans) for each of the plurality of UAVs based at least on the first telemetric data; and iteratively revise the plurality of plans. The plurality of plans can include an instruction for at least one of the UAVs of the plurality of UAVs to travel to a recharging station. Recharging stations of the present disclosure can be passive devices or can be in wireless communication with the automated system and/or one or more UAVs of the plurality of UAVs.

In some embodiments, at least one of the first telemetric data and the updated telemetric data includes position data and/or battery charge data.

In some embodiments, iteratively revising the plurality of plans is based on updated telemetric data received, via the receiver, from the plurality of UAVs.

At least one UAV of the plurality of UAVs can be an unmanned ground aerial vehicle (UGAV) comprising wheels for ground movement (which may also be referred to as a "hybrid" UAV), and the control data transmitted to the at least one UAV (i.e., to the UGAV) can comprise both flight navigation data and ground navigation data.

In some embodiments, the plans for each of the plurality of UAVs can be coordinated so as to at least one of: avoid collisions between UAVs of the plurality of UAVs; avoid collisions between UAVs and other objects or regions specified on a geographical navigation model; avoid interaction of the UAVs with events specified on a temporal model; synchronize the planned movements of the UAVs and the activation of their sensors in order to guarantee continuance of data acquisition of a particular region or event for an arbitrarily long amount of time; ensure that the plans for the UAVs allows the data acquisition specified as objective of the plan; and ensure that each UAV of the plurality of UAVs maintains a battery charge that is above a predetermined level, which could be different for each UAV.

In some embodiments, the plans can be coordinated to ensure that at least one UAV is present in each of a predetermined plurality of geographic zones.

In some embodiments, the plans can be coordinated to ensure that no more than one UAV is present in each of a predetermined plurality of geographic zones.

In some embodiments, the updated telemetric data received from the plurality of UAVs can include a UAV fault notification.

In some embodiments, at least one of the first telemetric data and the updated telemetric data can include meteorological data.

In some embodiments, the updated telemetric data can include trigger event data.

In some embodiments, the control data can include at least one of: ground navigation data, flight navigation data, data acquisition data, communication data, take-off data, landing data, docking data and recharging data.

In some embodiments, the plans are coordinated so as to run substantially concurrently with one another.

In some embodiments, a method of controlling a plurality of unmanned aerial vehicles (UAVs) includes: (1) substantially simultaneously determining a plurality of plans for each of the plurality of UAVs based at least on the first telemetric data; and, subsequently, (2) iteratively revising the plurality of plans. Iteratively revising the plurality of plans can be performed at predetermined time intervals (e.g., at pre-specified times of day) and/or can be based on a decision made by a configured software program.

In some embodiments, the scheduling system includes a receiver, a transmitter, and a processor in communication with a memory. The receiver and/or transmitter might be the same in the scheduling system and/or the navigation system. The receiver can receive a first telemetric data from one or more external devices (e.g., UAVs), and the transmitter is configured to transmit control data to the external devices. The memory can include processor-issuable instructions to: substantially simultaneously determine a plurality of actions for the devices installed in each of a plurality of UAVs or in other pre-defined connected receivers that are not necessarily installed on UAVs (e.g., alarm systems, charging stations, etc.).

BRIEF DESCRIPTION OF THE DRAWINGS

In order to illustrate the way in which the above mentioned advantages and features of the embodiments can be obtained, a brief description of the components is provided in the appended drawings. It needs to be underlined that the figures are not drawn to scale, and similar elements, in terms of function or shape, are indicated through reference numerals; the drawings should be considered as illustrations of typical embodiments without limiting of the scope.

DETAILED DESCRIPTION

Figure 1:
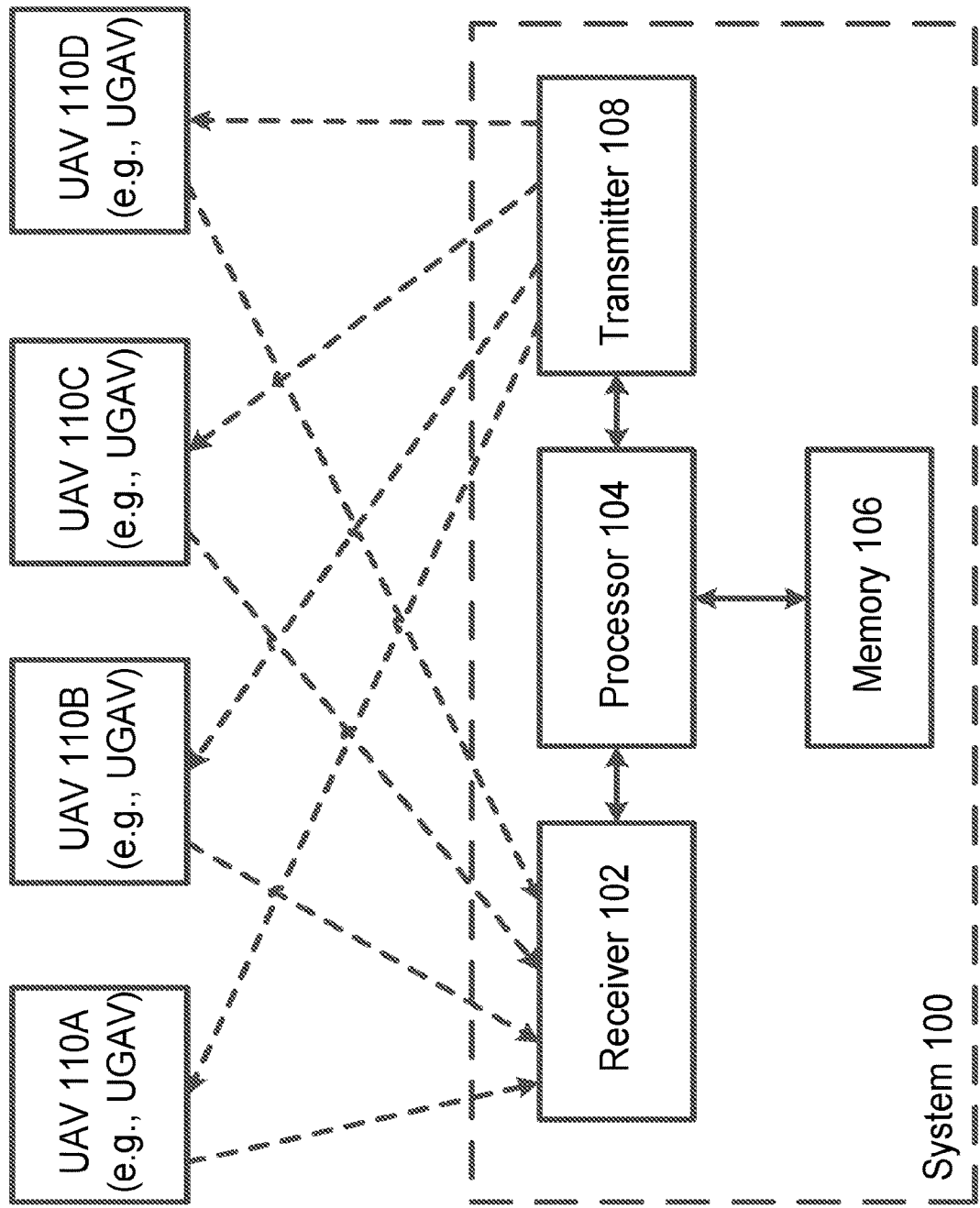
FIG. 1 is a block diagram of an automated system for controlling a plurality of unmanned aerial vehicles (UAVs), according to an embodiment.

Small helicopters and multi-copters, including hybrid airplanes with vertical take-off and landing (VTOL) vehicles, are a fast expanding technology in the civil market. They are increasingly used in operations that would expose people to risk (e.g., in chemical plants, nuclear plants, etc.), activities carried out in highly inaccessible areas (e.g., viaducts, skyscrapers, furnaces, offshore rescue, etc.), and monitoring procedures requiring a high degree of precision (e.g., inspection of cracks in dams/bridges, airplane maintenance, oil tank keels, etc.). In addition to industrial and governmental critical infrastructure applications, potential applications of VTOL vehicle technology range from industrial (e.g., in plants, machineries, etc.) to environmental safeguarding (e.g., volcanoes, parks, coasts, etc.), including the protection of sensitive areas (e.g., archaeological sites, territorial borders, etc.).

Some operations, such as 24/7 video surveillance, alarm response, monitoring and inspections, can benefit from an automatic navigation system. Research systems for planning and scheduling of autonomous robotic systems have been proposed, for example at international conferences such as the International Conference on Automated Planning and Scheduling (ICAPS) and the International Conference on Autonomous Agents and Multi-agent Systems (AAMAS). The terms "navigation," "planning" and "scheduling," as used herein, are defined according to their common usage in the relevant art, for example, as typified by ICAPS and AAMAS research.

Known autonomous navigation systems have relatively limited functionality. While they may be able to perform simple operations involving only one drone with a limited battery-time, they are typically unable to perform complex multi-drone operations continuously for an unlimited period of time. In addition, such systems may lack support for functionality such as: intelligent coordination of multiple UAVs at the same time, continuous 24/7 operations, automatic precise landing, automatic recharging, robustness with respect to unpredictability of the operations, and alarm integrations.

In addition, some UAVs may be equipped with a ground propulsion system that allows the UAV to translate and/or rotate on the ground, for instance by means of wheels of various nature, and to take off, fly and land by means for instance of propellers or wings. Examples include multi-copters equipped with an attached ground propulsion system, or mobile ground robots (e.g. mini-rovers) equipped with an attachment providing them wings and/or vertical take-off and landing propulsion methods. UAV-attachable ground propulsion systems are described in International Patent Application No.: PCT/US16/26152, titled "Ground Movement System Plugin for Vertical Take Off and Landing Unmanned Aerial Vehicles," filed on Apr. 6, 2016, the entire contents of which are hereby incorporated by reference in their entirety. Such systems consider planning/scheduling operations between only flying robots/aircrafts/UAVs or ground robots as separate entities, which can collaborate in some cases, but they are not designed to control robots that are capable both of flying and of actively moving on the ground.

As such, there is currently a need for systems and methods to direct autonomous operations, on the ground and/or in the air, of swarms of robots (such as UAVs) that are air and ground-capable, in indoor and/or outdoor environments, in a dynamic and reliable way, taking into account the options for the robots to automatically refuel their energy supply.

Embodiments described herein are related to a system for simultaneously controlling and/or coordinating operations or activities of multiple UAVs (i.e., a "swarm" of UAVs) at the same time, that include piloting under control of software. Such systems are referred to herein as "planners" (e.g., a UAV planner). The operations can consist of movement on the ground or on air, collectively referred to as "navigation" (e.g., at a particular time for a particular distance at a particular speed), as well as other operations such as data acquisition from an onboard sensor, communication with another UAV, use of actuators, take-off/landing, docking, monitoring a particular region of the navigation model for a particular time in a particular way (e.g., capturing landscape pictures of the area every 5 seconds, or continuous videos of a particular spot), communicating some data with a charging station (also referred to herein as a "UAV station"), docking into a specific UAV station, communicating via an external device, activating specific on-board sensors or equipment, activating specific actuators, taking-off vertically and reaching a specific altitude, landing in a specific trajectory and speed, recharging for a given amount of time. Control includes navigation as well as other forms of UAV control. Systems described herein are useful for the planning of missions using pre-computed and/or dynamic information, planning for guaranteed time-continuance without service disruption over an operational period that would consume more than the energy available in a single UAV, and for generating robust mission plans that can adapt to uncertainty and the occurrence of faults. Planners described herein can achieve efficient spatial and temporal coordination of UAVs in swarms.

The problem of choice of the operation is referred to as "scheduling", and the problem of considering scheduling together with navigation can be referred to as "planning." The planner can include software that is directed by one or more deterministic automated planning and scheduling algorithms, or interface to an optimization/artificial intelligence/heuristic software system, or can interface with another software operated partially by one or more human operators.

The flight of the UAVs can be controlled through some permanent or intermittent remote link/connection established by an onboard device (data transmission can be radio, wi-fi, cellular LTE or any other known mobile communication technology, including relaying through satellite, or with focused electromagnetic beams etc.). Navigation and operation instructions can be imparted commands such as application program interfaces (APIs) released by drone vendors or direct instructions to the autopilot of the UAV. Example APIs include those released by 3D Robotics, DJI or the MavLink protocol.

FIG. 1 is a block diagram of an automated system 100 for controlling a plurality of unmanned aerial vehicles (UAVs) 110A-110D, according to an embodiment. As shown in FIG. 1, the system 100 includes a receiver 102, a processor 104 a transmitter 108 and a memory 106. The receiver is configured to receive signals from a plurality of UAVs (e.g., including UGAVs) that collectively may form a "cluster." In some embodiments, the receiver is also configured to receive signals from one or more non-UAV locations, such as external sensors (e.g., alarm systems) on the ground. UAV clusters can work together in a coordinated fashion to accomplish one or more tasks, such as an inspection of a large infrastructure or a surveillance operation of an extended region. Each UAV of the plurality UAVs can have the capability to fly (e.g., with the aid of one or more wings and/or propellers) as well as to move along the ground/terrain (e.g., with the aid of tracks, wheels, etc.).

The signals received at the receiver 102 from the one or more UAVs can include telemetric data, such as: sensor data (e.g., collected by a corresponding UAV via one or more onboard sensors during flight and/or ground travel), position data, battery/energy level data, video data, captured static images, point-cloud data from lasers, structured or raw data processed by a on-board computer on the UAV, acceleration or velocity data useful for odometry, and/or the like.

The memory 106 can be local to the system 100 and/or may comprise cloud-based storage. The memory 106 can include processor-readable instructions to: substantially simultaneously determine a plurality of navigational and/or scheduling plans for each of the plurality of UAVs, for example based at least on a first telemetric data received from the plurality of UAVs, and to revise the plurality of navigational and/or scheduling plans (e.g., iteratively). Iteratively revising the plurality of plans can be performed at predetermined time intervals (e.g., at pre-specified times of day) and/or can be based on a decision made by a configured software program. The memory can also store one or more maps (e.g., 2D and/or 3D terrain maps), meteorological weather data, GPS coordinate data, UAV navigational history data, historical or statistical data relevant for the mission planning, information on the hardware performance for some UAV and sensors, information on the behavior of different human or automated users authorized to configure or control the planning system, etc.

The receiver 102 is operably coupled to, and in communication with, one or more processors 104 that are in communication with the memory 106 (e.g., a cloud-based database, or a local volatile or non-volatile memory), for example to retrieve instructions therefrom and/or to store data received from the one or more UAVs 110A-110D.

As discussed above, the processor 104 can be configured to retrieve data and/or instructions from the memory 106, and to determine a plurality of navigational and/or scheduling plans for each of the plurality of UAVs. Determining the plurality of navigational and/or scheduling plans for each of the plurality of UAVs can involve adherence to one or more predetermined and/or actively changing plan constraints and objective functions. The plurality of plans can include an instruction for at least one of the UAVs of the plurality of UAVs to travel to a recharging station. Such an instruction can include the timing, location and/or duration of a recharging event.

The plan constraints can be deterministic rules that influence the determination of a plan. The rules, for example, may force UAVs to recharge on the nearest available UAV station before their batteries are depleted. The rules can direct the UAVs to switch among themselves in a "relay mode" to perform an operation that lasts longer than the battery time of a single UAV. An example of such a rule would be that at a certain battery level, say 20%, a UAV needs to interrupt what it is doing in 30 seconds and reach a station within 2 minutes, while another UAV whose battery level is at least 80% and which can reach the point of the first UAV within 30 seconds needs to reach a position close to the first UAV in order to substitute it in its operation.

The plan constraints can represent the functioning of the UAVs and enforce relations between the movements or actions performed by the UAVs and the state of other variables defined in the system. For example, a rule could determine that the battery level variable associated to an UAV needs to decrease of a certain amount depending on the nature and extent of a movement of the robot. Another rule determines the position of the UAV on the navigation model over time, under specified conditions.

Plan constraints can take the form of probabilistic rules defined over intervals of time. For instance, a plan constraint could be that a certain area in the navigation model contains the presence of one UAV among the available UAV at least 50% of the total time allocated for all operations with the UAVs, during night hours.

Plan constraints can be formulated in a formal action language typical of formal logic in mathematics computer science, robotics, or artificial intelligence, or a formalism designed to reasoning about dynamical situations. Examples include PDDL/STRIPS variants, TAEMS, Boolean SAT, Situation/Fluent Calculus languages such as GOLOG, Linear Temporal Logic formulas, etc.

The processor 104 is operably coupled to the transmitter 108, for example to provide data to the transmitter 108 for wireless transmission to one or more of the plurality of UAVs 110A-110D, as shown in FIG. 1. The data transmitted to the one or more UAVs via the transmitter 108 can include the plurality of navigational and/or scheduling plans. These plans can include control data such as ground navigation data, flight navigation data, data acquisition data, communication data, take-off data, landing data, docking data and recharging data.

A navigational plan can include one or more of the following: itinerary of positional destinations (e.g. in the form of expected time of arrival at waypoints) for a specified period of time, change of value at prescribed times for all the status variables of the system, list of velocities and acceleration vectors for the prescribed trajectories, definition of the mean of navigation through the available propulsion methods (air or ground), list of orientation in space of the UAV at any given time during the calculated trajectories, etc. In some embodiments, the navigational plans for each of the plurality of UAVs are coordinated so as to at least one of: avoid collisions between UAVs of the plurality of UAVs; avoid collisions between UAVs and other objects or regions specified on a geographical navigation model; avoid interaction of the UAVs with events specified on a temporal model; synchronize the planned movements of the UAVs and the activation of their sensors in order to guarantee continuance of data acquisition of a particular region or event for an arbitrarily long amount of time; ensure that the navigation plans for the UAVs allows the data acquisition specified as objective of the plan; and ensure that each UAV of the plurality of UAVs maintains a battery charge that is above a predetermined level, which could be different for each UAV. In some embodiments, the navigational plans can be coordinated to ensure that predetermined number (e.g., at least one, not more than one, two, etc.) of UAVs are present in each of a set of predetermined geographic zones, for example as defined by the label of the zone in the navigation model (e.g. zones with high probability of human presence).

A scheduling plan can include one or more of the following, in a time resolved manner: one or more sensor activation instructions, one or more data collection instructions, instructions that result in the movement of mechanical parts of devices such as doors, passages, conveyor belts, instructions of controlling the light or sounds emitted by external devices, instructions that make external device communicate or transmit over a wired or wireless channel, instructions to activate devices such as anti-burglary systems (e.g. sprays, or smoke generators), etc. One or more navigational and/or scheduling plans can be transmitted to the one or more UAVs, and these navigational and/or scheduling plans can be identical to one another, different from each of the others (e.g., customized), or any combination.

The revision of the navigational and/or scheduling plans can be based on automatic predetermined triggers, such as at predetermined time intervals, or in response to one or more detected events (i.e., external triggers), such as the firing of an alarm, a change in weather conditions, a change in air-traffic-control policies, input from a human operator, the detection of a nearby vehicle, input from an external program that is modeling the happenings on the actionable environment, updated telemetric data received, via the receiver, from the plurality of UAVs, or input from a user that is in communication with the system 100. As used herein, a trigger is a data packet with a predetermined information structure, meant to be detected and classified by the processor 104 (e.g., a UAV or UGAV planner, as described in detail below) to be representative of the event that generated the trigger. When instructed by the processor 104, the transmitter 108 can transmit the plurality of navigational and/or scheduling plans to one or more of the plurality of UAVs 110A-110D simultaneously or substantially simultaneously. Also, the plurality of navigational and/or scheduling plans can be coordinated so as to run substantially concurrently (e.g., by being defined by the processor to be run at overlapping or concurrent time periods).

The updated telemetric data received from the plurality of UAVs comprises a UAV fault notification and/or trigger event data. For example, an anomaly can be a GPS link failure, or the battery status of an UAV is not following the predicted models, or the movement trajectories are different than the ones instructed. Alternatively or in addition, the updated telemetric data can include one or more of: meteorological data, sensor data, position data, battery life data, etc. In some embodiments, one or more UAVs of the plurality of UAVs 110A-110D is in wireless communication with another UAV of the plurality of UAVs 110A-110D and transmits, for example, data including meteorological data, sensor data, position data and/or battery life data to the other UAV.

The receiver 102, processor 104, memory 106 and transmitter 108 are co-located within a common enclosure or device.

Figure 2:
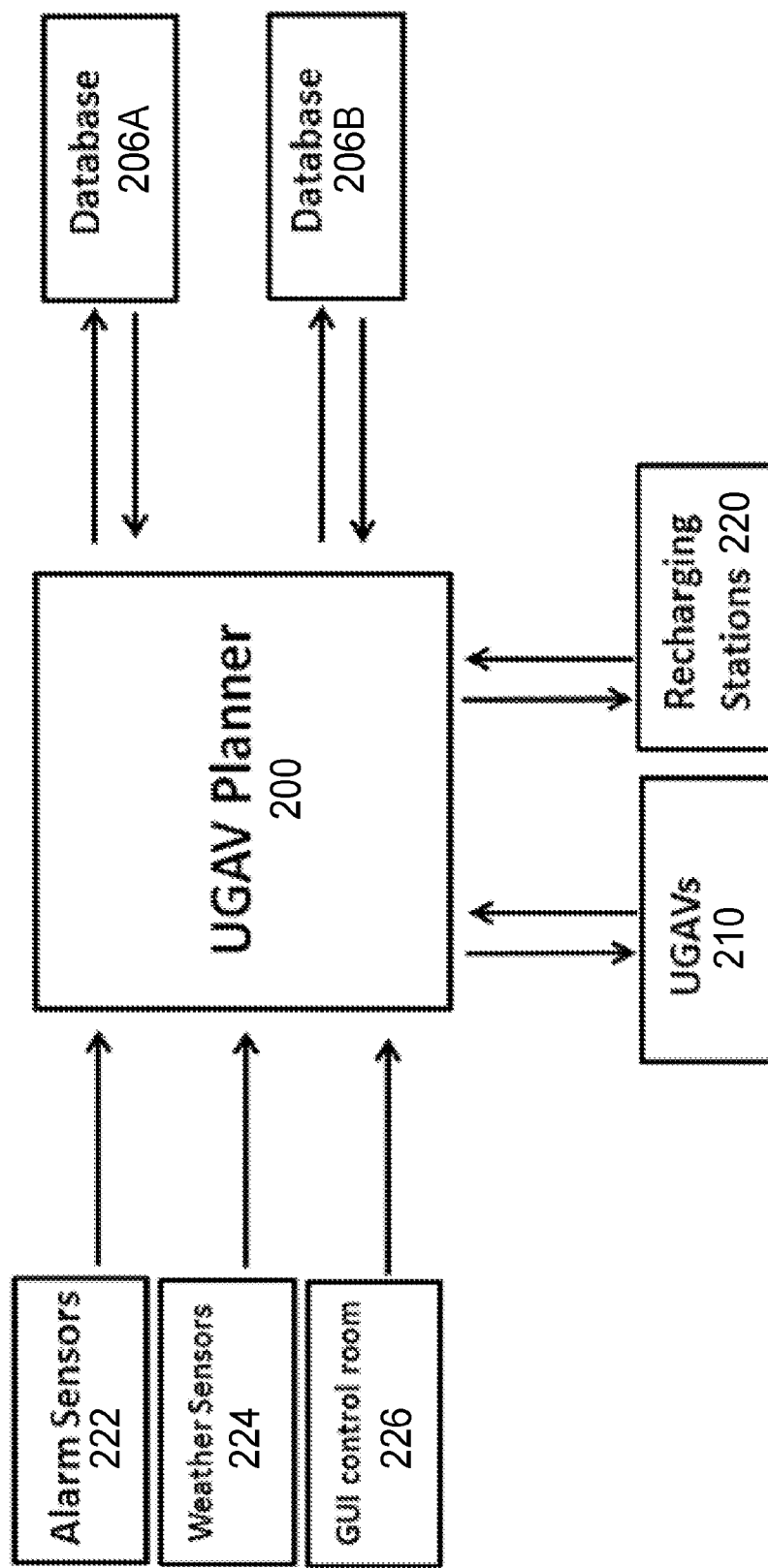
FIG. 2 is a block diagram of an unmanned ground aerial vehicle (UGAV) planner, according to an embodiment.

FIG. 2 is a block diagram of an unmanned ground aerial vehicle (UGAV) planner 200, or planning system, according to an embodiment. FIG. 2 represents a global description of how an embodiment of the system could be connected to the external word. Depending upon the embodiment, the UGAV planner 200 can be implemented in many forms of software, firmware and hardware, as long as the actual software code or algorithms or control hardware for the implementation is not limiting the uses and capabilities of the UGAV planner 200 as described herein. In all implementations set forth herein, the UGAV planner 200 generates a plan that will try to satisfy predetermined and/or actively changing plan constraints and objective functions using all resources available (e.g., UAVs, UGAVs) and all relevant information available to represent the status of the system at the time of execution of the planning algorithms. As shown in FIG. 2, the UGAV planner 200 can receive data from one or more alarm sensors 222 (e.g., on the ground/not airborne), a meteorological (weather) station via one or more weather sensors 224, and/or from an external trigger or stimulus, such as a button that can be pressed by a human in a graphical user interface (GUI) control room 226, or in any other user interaction (UI) system in a human-in-the-loop mode. In some embodiments, an external trigger can allow a human operator to take complete control of one or more UAV's navigation, for example through a joystick. In some embodiments, the one or more weather sensors 224 provide environmental information to the UGAV planner 200 via a data feed (e.g., including a geographical reference).

The UGAV planner 200 can receive data from one or more charging stations 220, for example indicating whether or not a UAV is presently charging there, the status of their mechanical components, etc., as if they were external sensors. The UGAV planner 200 can be wirelessly connected to, and receive telemetric data from, the UGAVs 210. In some embodiments, the UGAV Planner 200 may be informed of the telemetric status of all the UGAVs, without notice, or at a regular intervals of time.

Access of some or all information to the UGAV Planner 200 can be direct or mediated by a database or a third software.

The UGAV planner 200 can perform planning operations and generate navigational and/or scheduling plans (subject to any plan constraints) to control several UAVs 210 (e.g., UGAVs) to which the UGAV planner 200 is wirelessly connected, for example based on telemetry data received from the UAVs. Navigational and/or scheduling plans can be determined for a given interval of time (which may be finite, semi-infinite or open-ended) that respects any plan constraints, and returns information on the violation of the constraints, as well as information of plan quality if soft constraints are present, given enough computational resources and time to process on at least one processor. Methods to determine the navigational and/or scheduling plans include known methods in the domain of Planning and Scheduling and Combinatorial Optimization. Examples of computational techniques or solvers are: Branch and Bound, Dynamic Programming, Forward-Search, Heuristic searches, Trial and errors, Greedy methods, SAT-based formulations, Markov Decision Processes such as POMDP methods, Mixed-Integer-Linear-Programming solvers such as CPLEX or Gurobi, Iterative methods, Genetic Algorithms, Monte-Carlo Tree searches and Random Walks, multi-level heuristic techniques, Ant Colony optimization methods, Simulated annealing, Master-Agent decomposition software architectures, Disjunctive graphs methods, Benders Decompositions, Constraint Satisfaction Programming methods, Hierarchical Task Networks, Machine Learning Methods, including Unsupervised and Supervised learning, reinforcement learning, Deep Learning Methods, non-digital methods such as the use of analog or neuromorphic computers, and electronic, biological or quantum computing devices.

The UGAV planner 200 can be in communication with one or more databases (206A-206B) that store data relevant to the UGAV planning operations. In some implementations, the UGAV planner 200 can access status data (e.g., position data, weather data, speed/velocity data, battery life data, etc.) corresponding to one or more of the UAVs 210 through the one or more databases 206A-206B. Alternatively or in addition, the UGAV planner 200 can access geographical data through the one or more databases 206A-206B.

The UGAV planner 200 may have access to geographical data for an area where UGAV operations take place, and may be in permanent or intermittent connection with the UGAVs through a telecommunications link. The connection to the UGAVs may be such that the planning system can control the navigation of the UGAVs and the data acquisition of the sensors mounted on the UGAV, for example by transmitting the navigational and/or scheduling plans (e.g., including one or more scheduled recharging events) to the UGAVs 210.

The navigational and/or scheduling plans can include future position data for one or more of the plurality of UGAVs. The future position data can specify precise locations for the one or more of the plurality of UGAVs, or may specify ranges of position within which the one or more of the plurality of UGAVs are permitted to be at any given time.

Some embodiments, some plan constraints of the UAV planner can be that under certain conditions some of the UAV needs to be forbidden ground movement operations, or flight operations, in all or some of the prescribed area of operation. More generally, any restriction on the possible movement of the UAV can be formulated, even in a collective form. For example, it can be enforced that all the movements inside buildings or all the paths that cross regions where it is likely to be human presence needs to be performed on the ground.

The plan constraints can be configured during initialization of the UGAV planner 200, or can be injected in the UGAV planner 200 at any time, e.g., automatically by a packaged module available to the UGAV planner 200 and/or by a user through a graphical or command line User Interface. In some embodiments, the initialization or the update of the UGAV planner 200 includes cryptographic authentication, such as the digital signature of a patch update or the insertion of a user password (e.g., including multiple factor authentications).

In some embodiments, plan constraints can be defined as "soft constraints" or "objective functions," which can serve as a figure-of-merit for the UGAV planner 200 to distinguish among multiple different plans based on quality. These functions' outputs can be represented by a scalar, a vector or a tensor, or in general by any n-tuple of real numbers, provided a distance metric to determine the level of optimality is also defined. For example, an objective function could be to minimize the total amount of energy consumed in the plan, or to maximize the number of concurrent operations with all the available UAV.

In some embodiments, a plan generated by the UGAV planner 200 includes an instruction for a recharging station to increase the power of a recharging unit of a docked UAV. Another example is the opening of a door allowing a UAV to enter a building, as discussed further below with reference to FIG. 5.

In one implementation of the UGAV planner 200, the automated plan constraints and objective functions are converted in a form to be represented as a Boolean Satisfiability Problem. Alternatively, or concurrently, the problem can be formulated as a variant of job-shop-scheduling, or an unconstrained Mixed-Integer Programming problem, linear or non-linear.

In some implementations of the UGAV planner 200, the generated navigation plans can be modified by one or more obstacle avoidance algorithms (e.g., algorithms based on Vector Field Histograms (VFH)) or collision avoidance algorithms.

In some embodiments, a panner has absolute temporal information (e.g., it can be synchronized with external sensors) and can access on demand the following information within a specific time interval, given as input: (A) the values of the variables representing the status of the system (e.g. the position of the UAVs and their battery sensor status); (B) some pre-defined rules or "plan constraints" that depend on (A) and also on additional static conditions, such as the time and date of the day of operation, and the geographical information of the area where the operation takes place; (C) some other plan constraints that depend on (A) and (B) and also on additional dynamic conditions, such as the occurrence of the triggers by external sensors or human interaction.

Figure 3:
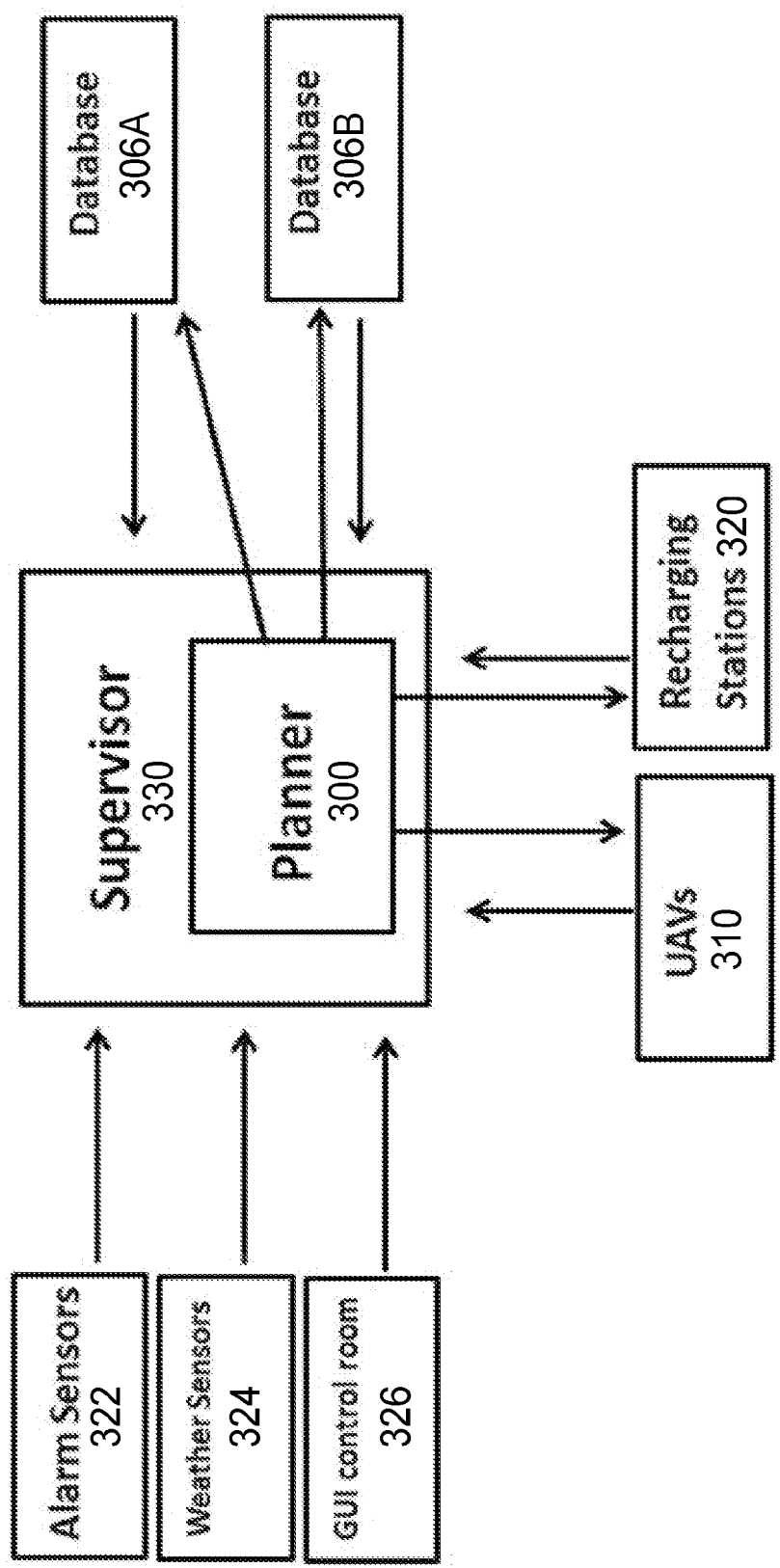
FIG. 3 is a block diagram of a planner that is subject to a supervisor function, according to an embodiment.

FIG. 3 is a block diagram of a planner 300 (e.g., a UGAV planner) that is subject to a supervisor function, according to an embodiment. More specifically, FIG. 3 shows a planner 300 that is encapsulated as a module of a supervisor 330 (e.g., an artificial intelligence system). The planner 300 and/or the supervisor 330 can be implemented in many forms of software, firmware and hardware, as long as the actual software code or algorithms or control hardware for the implementation is not limiting the uses and capabilities of the planner 300 and/or the supervisor 330 as described herein. In all implementations set forth herein, the planner 300 and/or the supervisor 330 generates a plan that will try to satisfy predetermined and/or actively changing plan constraints and objective functions using all resources available (e.g., UAVs, UGAVs) and all relevant information available to represent the status of the system at the time of execution of the planning algorithms. As shown in FIG. 3, the supervisor 330 and/or the planner 300 can receive data from one or more alarm sensors 322 (e.g., on the ground/not airborne), a meteorological (weather) station via one or more weather sensors 324, and/or from an external trigger or stimulus, such as a button that can be pressed by a human in a GUI control room 326. The supervisor 330 and/or the planner 300 can also receive data from a plurality of UAVs 310 and/or a plurality of UAV recharging stations 320, and the planner 300 can be configured to wirelessly communicate with the plurality of UAVs 310 and/or the plurality of UAV recharging stations 320. The supervisor 330 and/or the planner 300 can be in communication with one or more databases (306A-306B) that store data relevant to planning operations. The planner 300 can perform planning operations and create navigational and/or scheduling plans to control several UAVs 210 (e.g., UGAVs) to which the planner 300 is wirelessly connected. In some embodiments, the supervisor 330 can use the planner 300 to generate plans, schedules and/or actions for the plurality of UAVs 310 and one or more recharging stations 320, and to update the databases 306A-306B, however unlike in FIG. 2, the supervisor 330 has control over when the planner 300 is invoked (e.g., control over when the planner 300 transmits the plans, schedules and/or action data to the UAVs 310). In other embodiments, the planner 300 generates plans, schedules and/or actions for the plurality of UAVs 310 and one or more recharging stations 320, and the supervisor 330 has control over when the planner 300 is invoked (e.g., control over when the planner 300 transmits the plans, schedules and/or action data to the UAVs 310).

The supervisor 330 can query the planner 300 at regular intervals of time (e.g., about 10 seconds) with parameters representing projected models of reality based on the current status and/or on forecasting algorithms. The supervisor 330 can have its own internal policies regarding when and under what conditions execute a plan generated by the planner 300.

In some embodiments, the supervisor 330 program has memory access (data stored in a database 306A, 306B) of all generated and executed plans by the UAVs 310 and of the status variables over time, for example as communicated by the external sensors and by telemetry.

In some embodiments, the supervisor 330 program queries the planner 300 when a certain threshold of difference between the status of at least one of a UAV telemetry feed and a projected status predicted by the plan in execution computed by the planner 300 is reached. For example, the supervisor 330 could decide to "re-plan" when the integrated sum of the absolute values of the differences between all trajectories of UAVs 310 and their predicted model reaches a value of, for example, about 10 square meters, or when the sum of the absolute value of the time-shifts with respect to the predicted time of arrivals at specific waypoints is superior to 10 seconds.

In some embodiments, the supervisor 330 program is entirely or partially under the direction of a human operator, who determines or influences when a plan is generated by the planner 300 and when it is executed by the UAVs 310.

In one embodiment, the planner 300 is called to generate one or more plans in order to perform photography and/or video recordings of specific geographic sectors within a certain amount of time elapsed from the receipt of a trigger event from an alarm 322 installed on an industrial site. For example, the planner 300 could be called by a human-configured supervisor 330 to generate a plan lasting 15 minutes, with the objective of monitoring the sector were the alarm went off, as well as the perimeter of several buildings of an industrial campus along with the main gates and access roads, with specific pre-defined probabilities over the 15 minutes period. The planner may generate a plan that will try to satisfy the plan constraints and the objective functions using all resources available (e.g., UAVs or UGAVs in a swarm) and all information available to represent the status of the system at the time of execution of the planning algorithms.

In one embodiment, the planner 300 is called to generate one or more plans in order to perform inspections of machinery at specific times during the day, or at the earliest available time after the scheduled operation assuming that there are adverse atmospheric events affecting the quality of the data capture. For example, in a hydroelectric power plant, the planner 300 could be invoked at 11 am every day to inspect and map the status of a dam of height 100 m and width 600 m. The planner 300, running planning algorithms subject to these plan constraints could, for instance, generate plans that continuously use 8 UAVs in relay mode, with 4 UAVs active at any given time, for an operation lasting approximately 6 hours.

In some embodiments, the planner 300 is called at pre-defined times during the day, and the actions suggested are directly executed by the UAVs and/or other devices controlled by the planner 300.

In other embodiments, the planning can be invoked to generate solutions to other use cases. An example, non-exhaustive list of such use cases includes: video surveillance of urban areas, intrusion detection at the interior of warehouses, national border patrol, inspection of oil & gas facilities, inspection of bridges, inspection of the exterior of power plants, detection of fires or poaching in wilderness areas, detecting leakages over pipelines, harbor video surveillance and tracking of cargo, monitoring the activity of a volcano, 3D mapping of a construction site, and video and/or photo documentation of an area subject to a natural disaster, such as an earthquake.

In one implementation of the planner 300, a combination of open-source and proprietary solvers can be used to perform the planning. For example, an optimization software package such as IBM ILOG CPLEX Optimization Studio (CPLEX) could be used to solve the scheduling problem, while a genetic algorithm among those published in the robotics literature could suggest a navigation plan for the multi-agent system. In some cases, the resulting plans can be concurrently run by the supervisor 330 software on different solvers in order to have alternative solutions and choose to execute one according to a given policy configuration.

Figure 4:
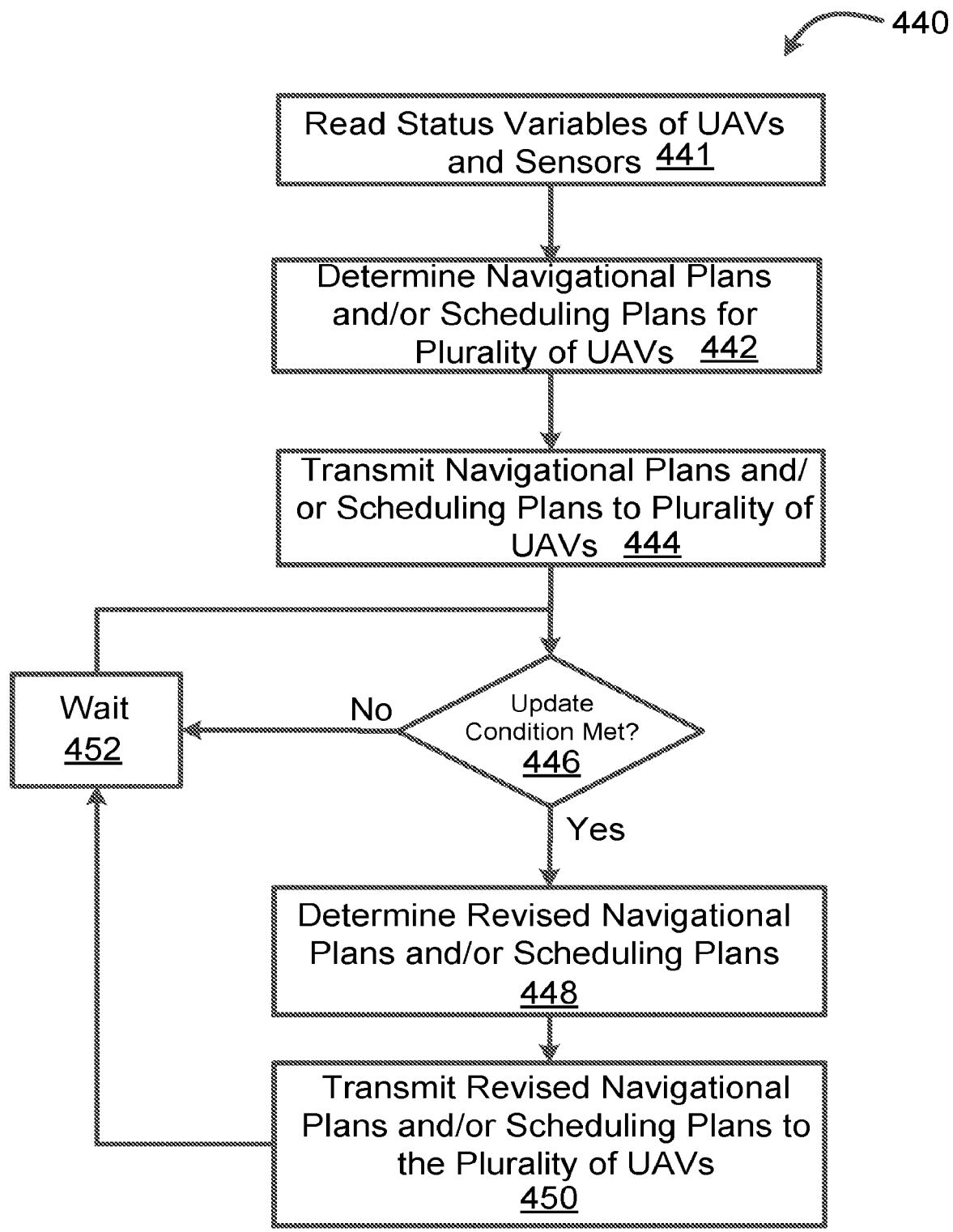
FIG. 4 is a flowchart depicting a method of controlling a plurality of UAVs, according to an embodiment.

FIG. 4 is a flowchart depicting a method 440 of controlling a plurality of UAVs (e.g., UGAVs), according to an embodiment. As shown in FIG. 4, the method 440, which is compatible with the systems shown in FIGS. 1-3, includes reading the status variables (e.g., docking positions, waypoint data, labels associated with UAVs and their status (e.g., is it flying or charging), descriptional labels, and/or the like) of UAVs, sensors and/or other external controlled devices 441, followed by determining (e.g., via the processor 104 of FIG. 1 or the UGAV planner of FIG. 2) a plurality of navigational plans and/or scheduling plans for a plurality of UAVs (442), e.g., based on the status variables. The plurality of navigational plans and/or scheduling plans is transmitted, at 444 (e.g., via a transmitter) to the plurality of UAVs. An evaluation is performed, at 446, of whether or not an update condition has been met. Update conditions can include the passage of a predetermined period of time, the detected movement of one or more of the plurality UAVs beyond a predetermined geographical window or volume, the receipt (e.g., at a receiver or at a processor) of an external trigger or stimulus, etc. If an update condition is not met, the method proceeds to 452, a "wait" period, and returns to evaluation 446 either autonomously (e.g., after a predetermined wait period), in response to one or more external triggers, or both. If it is determined that an update condition is met at 446, then the method proceeds to 448, where one or more revised navigational plans and/or scheduling plans are determined. The one or more revised navigational plans and/or scheduling plans are transmitted to one or more of the plurality of UAVs at 450. In some embodiments, the determination of revised navigational plans and/or scheduling plans at 448 includes determining revised navigational plans and/or scheduling plans for all UAVs of the plurality of UAVs and, correspondingly, a plurality of revised navigational plans and/or scheduling plans are transmitted—one to each of the plurality of UAVs. The method then proceeds to wait, at 452, until a predetermined wait period has elapsed, or until one or more external triggers are received, before again evaluating whether a subsequent update condition has been met (at 446).

In some embodiments, the method of FIG. 4 further includes the use of a 2D map and/or a 3D map as an input for a navigation model (e.g., to generate the navigational plan at 442). Such maps may be representative of the terrain and/or status of the region of operation. Alternatively or in addition, the maps can include data on one or more charging stations and/or data on an initial position of UAVs of the plurality of UAVs at a point in time. The navigation model can be created by a human operator, or be a default model available, for example, from a library of models. The navigation model can include a reference to the location of docking/landing/recharging stations (a "UAV Station"). UAV Stations can comprise devices or locations on the ground (which may or not be mobile) where the UAVs can autonomously dock, either through landing directly on them or through entering them by means of a ground accessible opening, in order to recharge/swap their batteries (or energy supply units, e.g., hydrogen fuel cells), be protected from the outside environment, and/or update, upload or download the data stored in their companion computer system on board.

Figure 5:
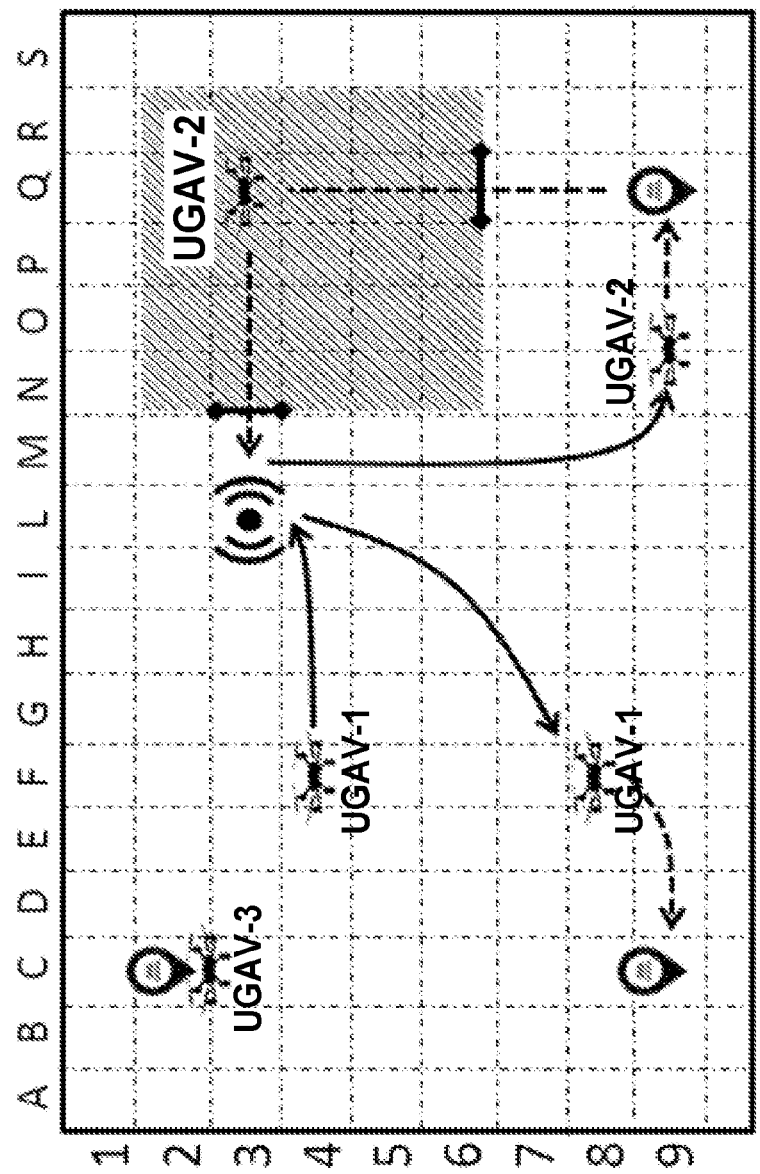
FIG. 5 illustrates an alarm monitoring plan involving 3 UGAVs, over a rectangular navigation model, according to an embodiment.
Figure 6:
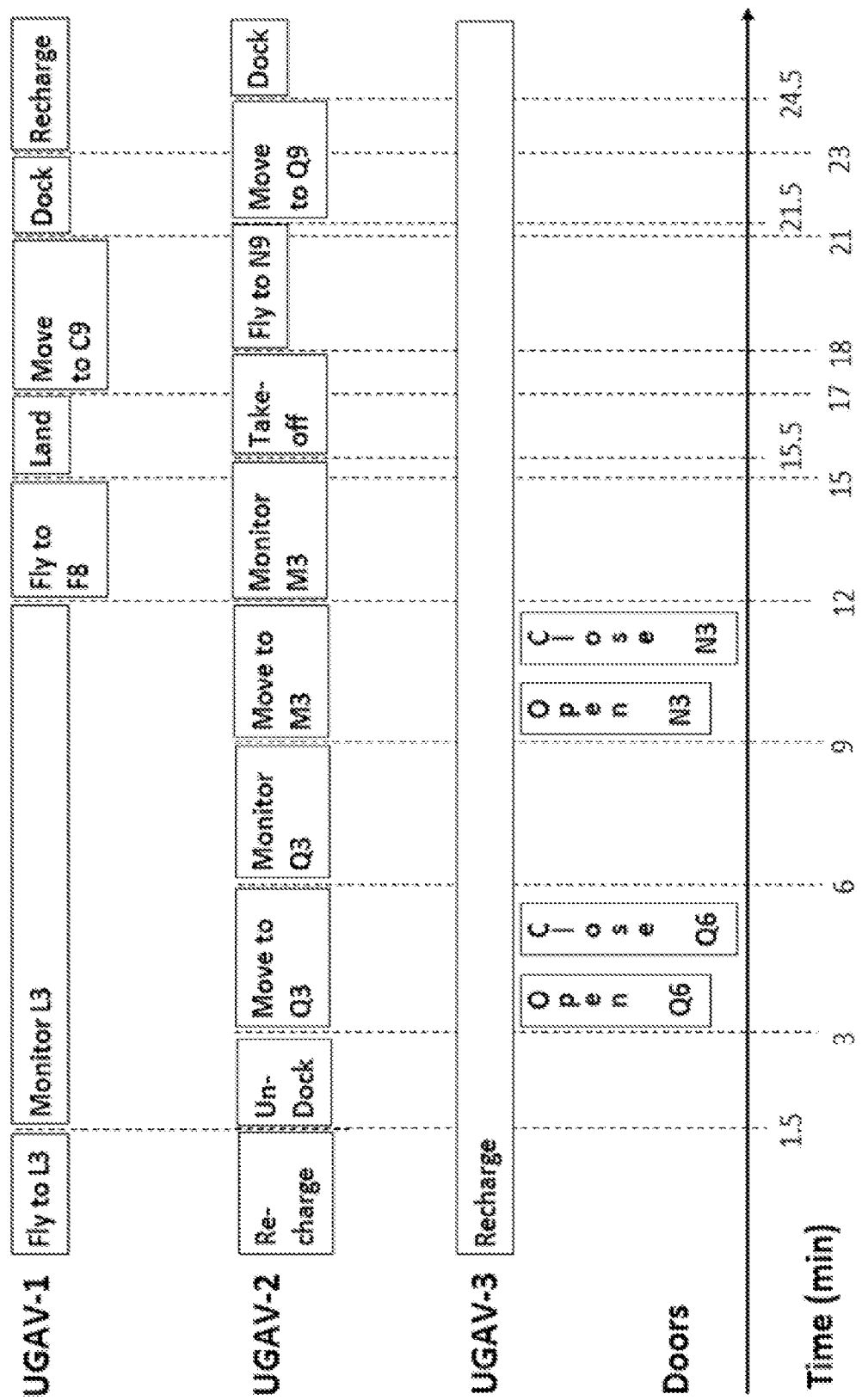
FIG. 6 illustrates the alarm monitoring plan of FIG. 5 over time.

FIG. 5 illustrates an alarm monitoring plan involving 3 UGAVs, over a rectangular navigation model, according to an embodiment. The alarm monitoring plan, generated for example by a system similar to those described above with reference to FIGS. 1-3 and/or according to a method similar to the method of FIG. 4, has a duration of 26 minutes, and has an objective of continuously monitoring an alarm sector (defined, at least in part, by the chart area) for at least 15 minutes (a plan "constraint"). In the alarm monitoring plan of FIG. 5, UGAV-1 was in sector F4 at the beginning of the scheduled time, and was subsequently sent to check an alarm in sector L3, which had just gone off and which triggered the generation of the plan. Then, the UGAV-1 was sent to a station in C9 to recharge. In order to dock into the station, the UAV flies to, and lands in, F8 and then moves along the ground to reach C9. Concurrently to all these actions, a second UGAV-2 is sent to move on the ground from a station in Q9 where it was recharging towards a region to monitor inside a building (Q3). This region to monitor could be optional (and, for example, specified as a soft constraint). In order to facilitate the robot's entry into the building, the planner (e.g., similar to the processor 104 of FIG. 1, the UGAV planner of FIG. 2, or the planner 300 of FIG. 3) coordinates the opening and closure of doors in Q6. After a brief monitoring period, UGAV-2 is sent to the sector L3 to replace the monitoring action of UGAV-1 which, as soon as UGAV-2 arrives, leaves sector L3. After 3.5 minutes, UGAV-2 leaves the sector, taking off and flying to sector N9, where it lands and it moves to dock into the recharging station in Q9 where it was hosted 21 minutes earlier. During all these operations, a UGAV-3 in C2 is recharging. FIG. 6 illustrates the alarm monitoring plan of FIG. 5 from a temporal profile point of view, through a Gantt chart. For each action described in the alarm monitoring plan, a corresponding task bar is drawn and defined. Tasks that are vertically aligned are executed synchronously.

Figure 7:
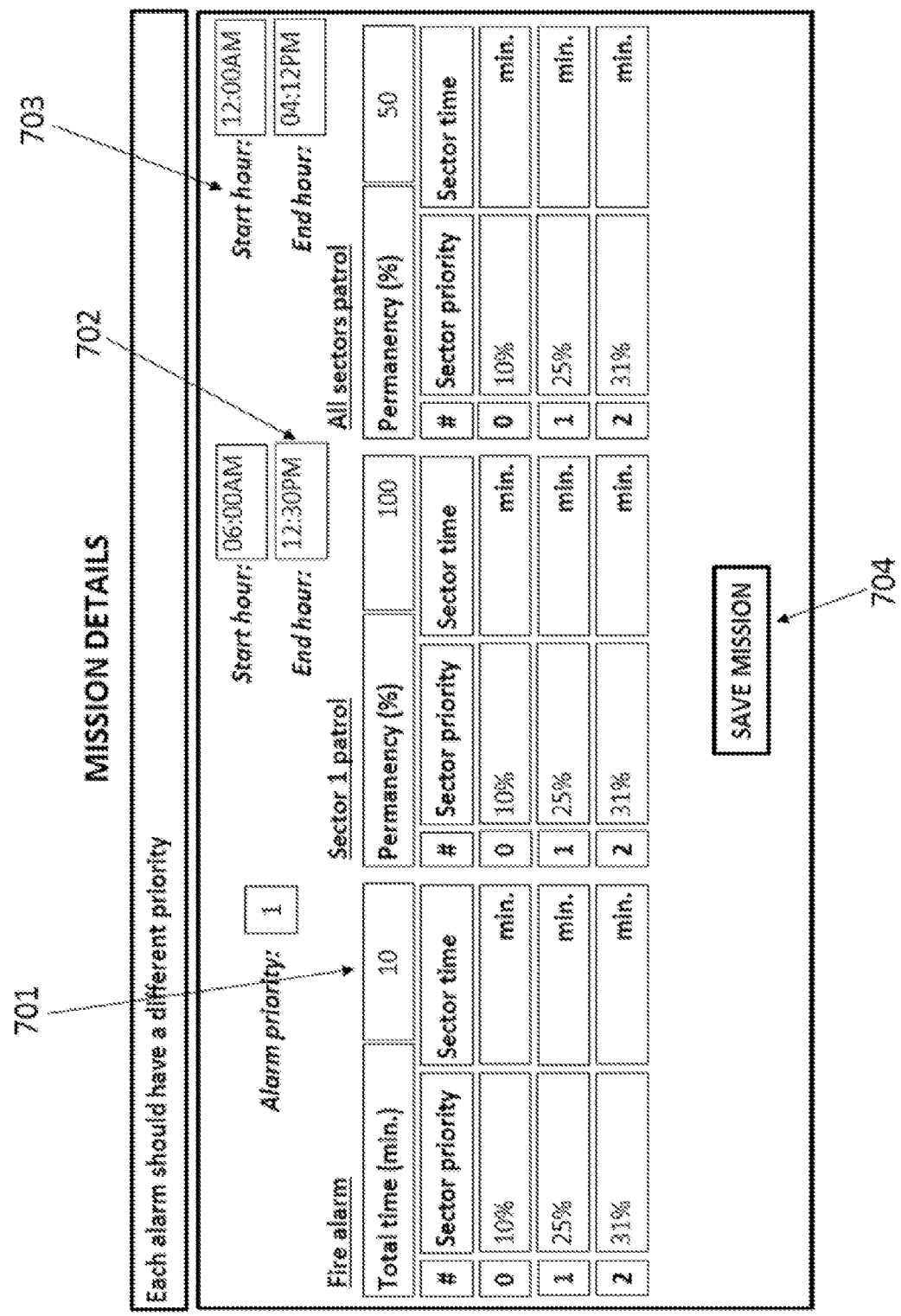
FIG. 7 illustrates a front-end graphical interface to configure some aspects of a scheduling system, according to an embodiment.

FIG. 7 illustrates an embodiment of a graphical interface allowing a human operator to configure the planning system and/or the supervisor software. Form 701 is a form via which an operator can set up a time duration in minutes of a specific plan called "Fire Alarm" that is for example being called when a trigger of a fire alarm sensor goes off. In the form boxes, the user can specify the importance of each specific sector (to be defined on a navigation model) to be set as a parameter of plan constraints. At 702, a "Sector 1 patrol" plan is configured, in a box, for example to be starting each day at 6:00 AM and to last until 12:30 PM. An "All sectors patrol" plan for the scheduling of a patrol operation of all sectors in the map is shown at 703. A button 704 is included to submit the values of the form boxes to the planner/supervisor that is now configured.

Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter.

What is claimed is:

1. An automated system for controlling a plurality of unmanned aerial vehicles (UAVs), the system comprising:
   a receiver that receives first telemetric data from the plurality of UAVs;
   a transmitter for transmitting control data to the plurality of UAVs; and
   at least one processor in communication with a memory storing processor-issuable instructions to:
   substantially simultaneously determine a plurality of plans for each of the plurality of UAVs and for a predetermined time period based at least on the first telemetric data; and
   iteratively revise the plurality of plans,
   wherein the plurality of plans for each of the plurality of UAVs are coordinated so as to at least one of: avoid collisions between UAVs of the plurality of UAVs; avoid collisions between UAVs and other objects or regions specified on a geographical navigation model; avoid interaction of the UAVs with events specified on a temporal model; synchronize the planned movements of the UAVs and the activation of their sensors in order to guarantee continuance of data acquisition of a particular region or event for an arbitrarily long amount of time; ensure that the plans for the UAVs allows the data acquisition specified as objective of the plan; and ensure that each UAV of the plurality of UAVs maintains a battery charge that is above a predetermined level, which could be different for each UAV.

2. The system of claim 1, wherein at least one of the first telemetric data and the updated telemetric data includes position data.

3. The system of claim 1, wherein at least one of the first telemetric data and the updated telemetric data includes battery charge data.

4. The system of claim 1, wherein iteratively revising the plurality of plans is based on updated telemetric data received, via the receiver, from the plurality of UAVs.

5. The system of claim 1, wherein at least one UAV of the plurality of UAVs is an unmanned ground aerial vehicle (UGAV) comprising wheels for ground movement.

6. The system of claim 5, wherein the control data transmitted to the at least one UAV comprises flight navigation data and ground navigation data.

7. The system of claim 1, wherein the plurality of plans are coordinated to ensure that at least a predefined number of UAVs is present in each of a predetermined plurality of geographic zones.

8. The system of claim 1, wherein the plurality of plans are coordinated to ensure that no more than a predefined number of UAVs is present in each of a predetermined plurality of geographic zones.

9. The system of claim 1, wherein the updated telemetric data received from the plurality of UAVs comprises a UAV fault notification.

10. The system of claim 1, wherein at least one of the first telemetric data and the updated telemetric data comprises meteorological data.

11. The system of claim 1, wherein the updated telemetric data comprises trigger event data.

12. The system of claim 1, wherein the control data comprises at least one of: ground navigation data, flight navigation data, data acquisition data, communication data, take-off data, landing data, docking data and recharging data.

13. The system of claim 1, wherein the plurality of plans are coordinated so as to run substantially concurrently.

14. The system of claim 1, wherein the plurality of plans includes an instruction for at least one UAV of the plurality of UAVs to travel to a recharging station.

15. A method of controlling a plurality of unmanned aerial vehicles (UAVs), the method comprising:
- substantially simultaneously determining a plurality of plans for each of the plurality of UAVs based at least on a first telemetric data; and,
- iteratively revising the plurality of plans,
- wherein the plurality of plans for each of the plurality of UAVs are coordinated so as to at least one of: avoid collisions between UAVs of the plurality of UAVs; avoid collisions between UAVs and other objects or regions specified on a geographical navigation model; avoid interaction of the UAVs with events specified on a temporal model; synchronize the planned movements of the UAVs and the activation of their sensors in order to guarantee continuance of data acquisition of a particular region or event for an arbitrarily long amount of time; ensure that the plans for the UAVs allows the data acquisition specified as objective of the plan; and ensure that each UAV of the plurality of UAVs maintains a battery charge that is above a predetermined level, which could be different for each UAV.

16. The method of claim 15, wherein iteratively revising the plurality of plans is based on a second, updated telemetric data received from the plurality of UAVs.

17. The method of claim 15, wherein iteratively revising the plurality of plans is performed at predetermined time intervals.

18. The method of claim 15, wherein iteratively revising the plurality of plans is based on a decision made by a configured software program.

* * * * *